(12) United States Patent
Ishimoto et al.

(10) Patent No.: US 9,015,108 B2
(45) Date of Patent: Apr. 21, 2015

(54) TIME-BOUND BATCH STATUS ROLLUP FOR LOGGED EVENTS

(75) Inventors: Guy Ken Ishimoto, Roswell, GA (US); Lucy Wanda Loftin, San Diego, CA (US); Minhhang Thi Le, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 13/601,246

(22) Filed: Aug. 31, 2012

(65) Prior Publication Data

US 2014/0067755 A1    Mar. 6, 2014

(51) Int. Cl.
*G06F 17/30* (2006.01)
(52) U.S. Cl.
CPC ............................... *G06F 17/30551* (2013.01)
(58) Field of Classification Search
None
See application file for complete search history.

(56) References Cited

U.S. PATENT DOCUMENTS

| | | | |
|---|---|---|---|
| 5,890,154 A | 3/1999 | Hsiao et al. | |
| 7,801,855 B2 | 9/2010 | Kim et al. | |
| 7,890,461 B2 | 2/2011 | Oeda et al. | |
| 2005/0235001 A1* | 10/2005 | Peleg et al. | 707/200 |
| 2009/0094294 A1 | 4/2009 | Morris et al. | |

OTHER PUBLICATIONS

Materialized View Fast Refresh Performance Tips by V.J. Jain, Jul. 2007, http://www.dba-oracle.com/t_materialized_view_fast_refresh_performance.htm.*

* cited by examiner

*Primary Examiner* — Robert Beausoliel, Jr.
*Assistant Examiner* — Hau H Hoang
(74) *Attorney, Agent, or Firm* — Schwegman, Lundberg & Woessner, P.A.

(57) ABSTRACT

Techniques for time-bound batch status rollup for logged events are provided. A status for each action defined in a database log is resolved during a configured interval of time. The statuses for the actions are aggregated at the end of the interval of time and then joined back into the log.

19 Claims, 3 Drawing Sheets

TIME-BOUND BATCH STATUS ROLLUP FOR LOGGED EVENTS

BACKGROUND

Some Data Warehouse's provide what is known as a Common Alerting Mechanism (CAM). CAM provides an alerting service wherein clients, send requests for action sets to be performed. An action set is a named aggregation of one or more physical actions, where a physical action may be one of: send email; generate SNMP trap; run a user-defined program; etc.

The CAM service receives alert requests, executes the actions configured for the alert, and logs the statuses of the actions to database tables. For each action set, statuses are logged at two levels:

1) A summary status is written in table cam_alert_log; one status per action set.
2) Each individual, physical, action within the action set is assigned its own status in table cam_alert_status_log; e.g. an action set that sends an email and generates a Simple Network Management Protocol (SNMP) trap will have two statuses in cam_alert_status_log: one for the email and one for the trap.

An action set's summary status reflects the set of statuses for its physical actions, and will change dynamically as its associated physical actions are executed, encounter errors, or complete successfully. For example, a typical action set will begin with a PENDING status, meaning that the associated physical actions have not yet completed. If all physical actions complete successfully, then the action set summary status is updated to SUCCESS. On the other hand, if all physical actions fail, then the summary status is updated to FAILED. Finally, if some physical actions were successful and others failed, then the summary status is updated to PARTIAL.

CAM has the capability to process multiple alert actions at any given time. Monitoring the statuses of the physical actions and rolling them up to the corresponding action set summary statuses in cam_alert_log are costly operations for the CAM service.

SUMMARY

In various embodiments, techniques for time-bound batch status rollup for logged events are presented. According to an embodiment, a method for rolling up logged events is provided.

Specifically,.

DETAILED DESCRIPTION

Figure 1:
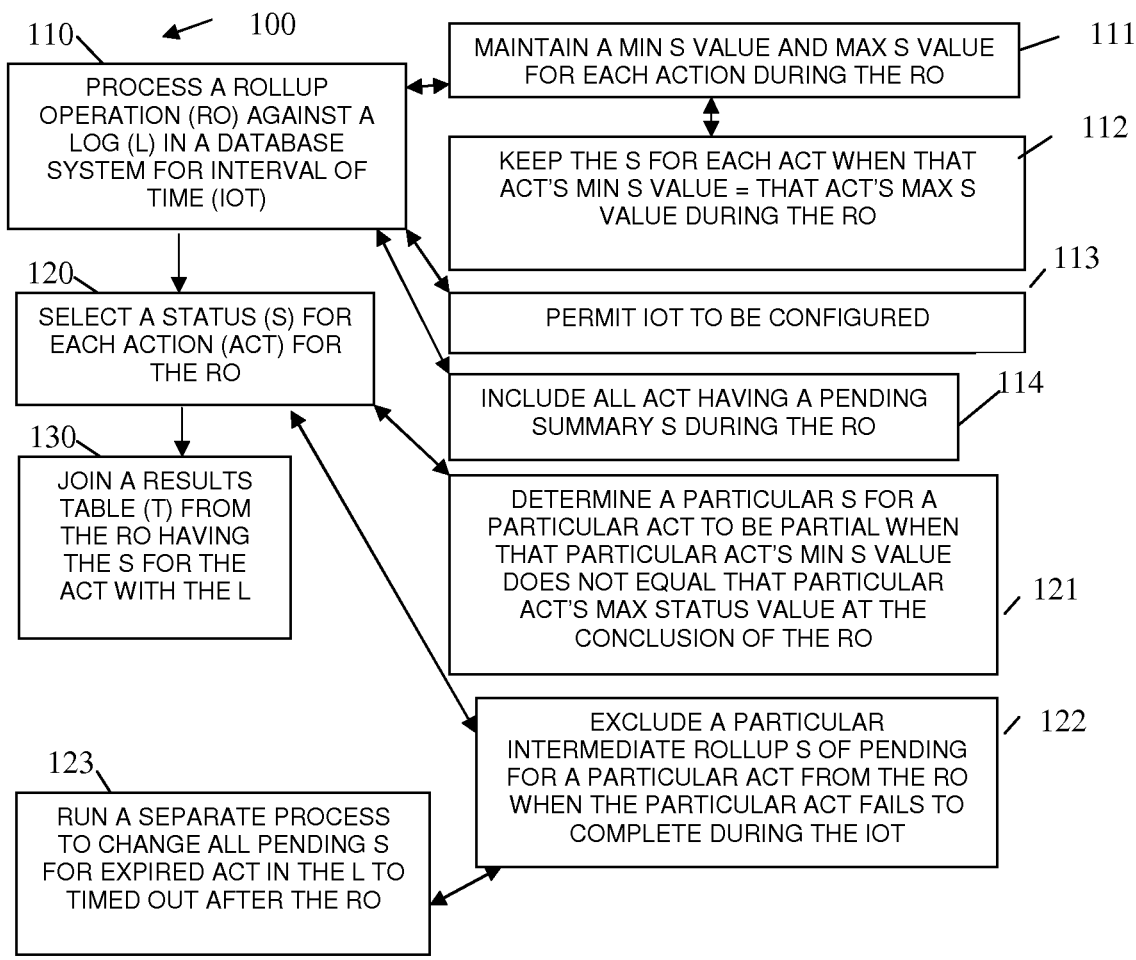
FIG. 1 is a diagram of a method for rolling up logged events, according to an example embodiment.

FIG. 1 is a diagram of a method 100 for rolling up logged events, according to an example embodiment. The method 100 (hereinafter referred to as "event updater") is implemented, programmed, and resides within a non-transitory computer-readable storage medium for execution on one or more processors of a network that are specifically configured to execute the event updater. The network can be wired, wireless, or a combination of wired and wireless Before discussing the processing reflected in the FIG. 1 for the event updater, a variety of additional context and embodiments for the event updater is presented for purposes of illustration and comprehension.

CAM submits a time-bound batch status rollup statement to its log database at regular intervals to efficiently monitor and rollup low-level statuses to summary statuses. The operation is encapsulated by the following example SQL:

```
UPDATE cam_alert_log L1
  SET generalStatus = R1.rollupStatus
  FROM
    (SELECT entryId,
           CASE WHEN minStatus = maxStatus
           THEN maxStatus
           ELSE #PARTIAL#
           END AS rollupStatus
    FROM
      (SELECT s.entryId, MIN(status), MAX(status)
        FROM cam_alert_status_log s
    INNER JOIN cam_alert_log a ON a.entryId = s.entryId
      WHERE a.generalStatus = #PENDING#
        AND a.logTimestamp > CURRENT_TIMESTAMP -
    INTERVAL '#timeoutMinutes# MINUTE'
      GROUP BY 1
      HAVING MAX(status) < #PENDING#)
      T1 (entryId, minStatus, maxStatus)
    )
    R1 (entryId, rollupStatus)
    WHERE L1.entryId = R1.entryId
                          © Teradata, Inc. 2012
```

The following discussion refers to this update SQL as the batch status rollup operation (event updater with reference to the FIG. 1).

Log Tables and Status Values Used by the Batch Status Rollup Operation:

The database log tables may be defined as follows:

```
// Summary log table (contains one row per action set)
CREATE TABLE public.cam_alert_log
(
  entryId          BIGSERIAL PRIMARY KEY,
  logTimestamp     TIMESTAMP WITH TIME ZONE NOT NULL
DEFAULT CURRENT_TIMESTAMP,
  source           VARCHAR(256) NOT NULL,
  alertId          INTEGER,
  severity         INTEGER,
  systemName       VARCHAR(256),
  description      VARCHAR,
  generalStatus    INTEGER // summary (rollup) status
);
// Physical status table (contains one row per physical action)
CREATE TABLE public.cam_alert_status_log
(
  statusId         BIGSERIAL PRIMARY KEY,
  entryId          BIGINT NOT NULL, // foreign key
  actionName       VARCHAR(256) NOT NULL,
  notificationType VARCHAR(128) NOT NULL,
  descriptor       VARCHAR(256) NOT NULL,
  updateTimestamp  TIMESTAMP(3),
  status           INTEGER, // physical action status
  statusMessage    TEXT
);
                          © Teradata, Inc. 2012
```

The status values used in CAM can include, by way of example:

| Mnemonic | int value | Description |
| --- | --- | --- |
| PENDING | 500 | In cam_alert_log, this means one or more physical actions have not yet completed. In cam_alert_status_log, it means the physical action has not completed. |
| PARTIAL | 400 | In cam_alert_log, this means all physical actions belonging to this action set have completed: some physical actions were successful but at least one failed. This status is not used in cam_alert_status_log. |
| ABEYED | 300 | The action set was skipped. This status is not used in cam_alert_status_log. |
| SUCCESS | 200 | In cam_alert_log, this means all physical actions belonging to this action set have completed successfully. In cam_alert_status_log, it means the physical action completed successfully. |
| FAILED | 100 | In cam_alert_log, this means all physical actions belonging to this action set have completed and failed. In cam_alert_status_log, it means the physical action failed. |
| TIMEDOUT | 50 | Action has timed out without completing. |

Note that PENDING status is defined to be numerically greater than the other statuses. We take advantage of this fact in the batch status rollup statement in order to quickly identify action sets for which all corresponding physical actions have completed (and are therefore eligible to be updated with a rollup status).

Time-Bound Batch Status Rollup Operation Detail:

The innermost select statement produces transient table T1, containing one row per action set (corresponding to the unique entryId): the minimum and maximum physical action status values belonging to the action set are recorded in the minStatus and maxStatus columns, respectively.

- The WHERE conditions of this select statement restrict its answerset to action sets for which the last known summary status is PENDING (not yet completed).
- The answerset is further reduced by a HAVING clause: the expression (MAX(status)<#PENDING#) filters out any action sets for which one or more physical actions are still PENDING.
- Time-bound: An additional condition in the WHERE clause allows us to limit the scope of the query to an interval of time, represented by the #timeoutMinutes# parameter. #timeoutMinutes# is a tunable value that serves as a threshold on how long to wait for action sets to complete; any action sets for which one or more physical actions have not completed in #timeoutMinutes# minutes are considered "timed out" or expired—no longer eligible for status rollup. A separate timeout update operation is performed periodically to change the cam_alert_log.generalStatus value of expired action sets from PENDING to TIMEDOUT.

The outer select statement uses transient table T1 to generate rollup action status values, producing the R1 answerset.

- The CASE logic assigns one of SUCCESS, FAILED or PARTIAL to the action set. That is, if all physical action statuses are the same (i.e. minStatus equals maxStatus), then that status becomes the action set's rollup status; otherwise, the physical action statuses were mixed (some SUCCESS, some FAILED), so the action set's rollup status becomes PARTIAL.

Finally, the update statement does a simple join of cam_alert_log with transient table R1 to set the rollup statuses (cam_alert_log.generalStatus) for the corresponding action sets.

Efficiencies:

Statuses are rolled up in batches vs. one at a time. This saves the CAM service from having to track and update the summary status of each physical action individually. Instead, CAM simply submits the update request at regular intervals, and the database engine performs the status rollups for any actions that have completed during the latest interval.

All data stays on the database server, avoiding network and/or interprocess overhead that would be required if the CAM service itself were to process the rollups.

This solution is an efficient method for rolling up low level event statuses to higher level group statuses, where the number of groups and the numbers of events belonging to each group are not known in advance.

A concise SQL update statement executed at regular intervals of time performs the rollup.

A major advantage of this solution becomes readily apparent when compared to the performance of an iterative rollup method. The following function (a postgresql user-defined function) is an iterative implementation of the rollup operation:

```
CREATE FUNCTION iterativeRollup( ) RETURNS INTEGER
AS '
DECLARE
   PENDING INTEGER DEFAULT 500;
   rowVal RECORD;
   minStatus INTEGER;
   maxStatus INTEGER;
   rollupStatus INTEGER;
   updateCount INTEGER;
BEGIN
   updateCount := 0;
   FOR rowVal IN
   SELECT entryId FROM cam_alert_log
   WHERE generalStatus = PENDING
      AND logTimestamp > CURRENT_TIMESTAMP -
INTERVAL #timeoutMinutes# MINUTE
   LOOP
      SELECT MIN(status), MAX(status) INTO minStatus, maxStatus
      FROM cam_alert_status_log WHERE entryId = rowVal.entryId;
      IF PENDING = maxStatus THEN
         rollupStatus := PENDING;
      ELSIF minStatus < maxStatus THEN
         rollupStatus := maxStatus;
      ELSE
         rollupStatus := maxStatus;
      END IF;
      IF rollupStatus < PENDING THEN
         EXECUTE "UPDATE cam_alert_log SET generalStatus = "
         || rollupStatus || " WHERE entryId = " || rowVal.entryId;
         updateCount := updateCount + 1;
      END IF;
   END LOOP;
   RETURN updateCount;
END;
'
```

© Teradata, Inc. 2012

The iterativeRollup function is basically a loop which performs one iteration for each action set in the master cam_alert_log table. On each iteration, the function examines the physical action (detail) statuses from cam_alert_status_10 g that are associated with the "current" action set, and updates the action set's generalStatus in the master table (cam_alert_log) accordingly. So, for example, if there are 1000 action sets with PENDING status, then this function will perform 1000 queries against the cam_alert_status_log table to examine the associated physical action statues, and may perform up to 1000 individual update operations to roll up the summary statuses to the master table.

As a test scenario, a master cam_alert_log was populated with 1000 action sets, all having PENDING status; the cam_alert_status_log detail table was populated with 4 physical actions for each action set, for a total of 4000 physical action statuses. The physical action statuses were defined such that: 20% of the resulting rollup statuses were unchanged (PENDING); 20% rolled up to PARTIAL; 20% rolled up to FAILED; and 40% rolled up to SUCCESS. The following table shows the observed response time for each rollup method:

| Method | batch status rollup | iterative |
|---|---|---|
| Response Time (seconds) | | |
| 1000 actions | 0.05 | 0.78 |
| 2000 actions | 0.18 | 2.90 |

The time-bound batch status rollup consistently exhibited better than order of magnitude improvement over the iterative method.

It is within this context that the processing associated with the event updater is discussed with reference to the FIG. 1.

At 110, the event updater processes a rollup operation against a log in a database system for an interval of time. That is, the rollup operation is processed in batch and for a defined period of time. An example implementation of the rollup operation is presented and discussed above.

According to an embodiment, at 111, the event updater maintains a minimum status value and a maximum status value for each operation during the interval of time for the rollup operation.

Continuing with the embodiment of 111 and at 112, the event updater keeps the status for each action when that action's minimum status value equals that action's maximum status value during the rollup operation.

In still another case, at 113, the event updater permits the interval of time to be configurable.

In another situation, at 114, the event updater includes only actions having a last known summary status of pending during the rollup operation.

At 120, the event updater selects a status for each action for the rollup operation.

In an embodiment, at 121, the event updater determines a particular status for a particular action to be partial when that particular action's minimum status value does not equal that particular action's maximum status value at the conclusion of the rollup operation. This was also discussed in detail above.

According to an embodiment, at 122, the event updater excludes a particular status of pending for a particular action from the rollup operation when the particular action fails to complete during the interval of time.

Continuing with the embodiment of 122 and at 123, the event updater runs a separate process to change pending statuses in the log to timed out for expired actions after the rollup operation. Expired actions are those for which the expression found in the "time-bound batch status rollup" statement as well as the "iterative rollup" function, both described previously: (logTimestamp>CURRENT TIMESTAMP p INTERVAL '#timeout Minutes# MINUTE') is FALSE).

At 130, the event updater joins a results table from the rollup operation having the statuses for the actions with the log.

Figure 2:
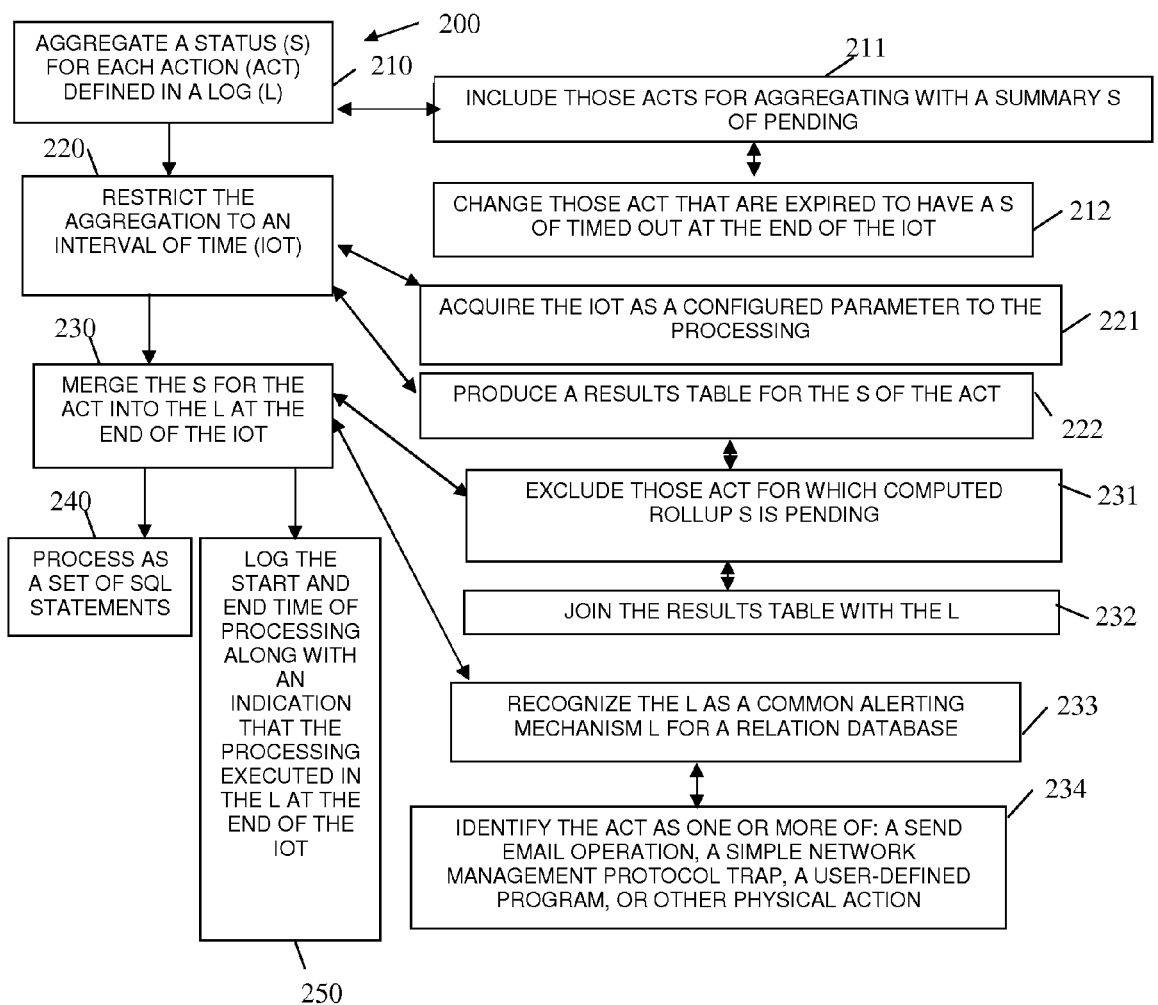
FIG. 2 is a diagram of another method for rolling up logged events, according to an example embodiment.

FIG. 2 is a diagram of another method 200 for rolling up logged events, according to an example embodiment. The method 200 (hereinafter referred to as "log processor") is implemented, programmed, and resides within a non-transitory computer-readable storage medium for execution on one or more processors of a network that are specifically configured to execute the log processor. The network can be wired, wireless, or a combination of wired and wireless.

The log processor is implemented and integrated into a relational database product offering, such as the Teradata® product distributed by Teradata, Inc. of Miamisburg, Ohio. It is noted that the log processor can be integrated to enhance any relational database product offering and/or relational database API. Moreover, the architecture of the processing environment for the log processor and the relational database product offering is a parallel processing environment to be processed using parallel processing techniques.

The log processor presents another and in some instances enhanced perspective of the event updater represented by the method 100 of the FIG. 1.

At 210, the log processor aggregates a status for each action defined in a log.

According to an embodiment, at 211, the log processor includes those actions from having a last known summary status of pending for aggregating.

Continuing with the embodiment of 211 and at 212, the log processor changes those pending actions that are expired to have a status of timed out at the end of the interval of time.

At 220, the log processor restricts the aggregation to an interval of time.

In an embodiment, at 221, the log processor acquires the interval of time as a configured parameter to the log processor.

In another case, at 222, the log processor produces a results table for the statuses of the actions.

At 230, the log processor merges the statuses for the actions into the log at the end of the interval of time.

According to an embodiment, at 231, the log processor excludes those actions having a computed rollup status of pending.

Continuing with the embodiment of 231 and at 232, the log processor joins the results table with the log.

In another case, at 233, the log processor recognizes the log as a Common Alerting Mechanism (CAM) log for a relational database, as was discussed above with reference to the FIG. 1.

Continuing with the embodiment of 233 and at 234, the log processor identifies the actions as one or more of: a send email operation, a SNMP trap, a user-defined function/program, or other physical action.

According to an embodiment, at 240, the log processor processes as set of SQL statements.

In another case, at 250, the log processor logs the start and end time or processing the log processor along with an indication that the log processor executed in the log at the end of the interval of time.

Figure 3:
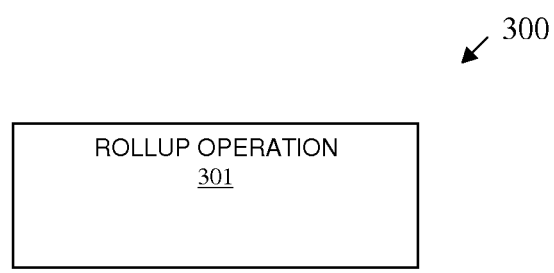
FIG. 3 is a diagram of event rollup system, according to an example embodiment.

FIG. 3 is a diagram of event rollup system 300, according to an example embodiment. The event rollup system 300 components are implemented, programmed, and reside within a non-transitory computer-readable storage medium and are executed on one or more processors of a network. The network is wired, wireless, or a combination of wired and wireless.

In an embodiment, the event rollup system 300 implements, inter alia, the various aspects of the FIGS. 1-2, as presented above.

The event rollup system 300 includes. Each of these components and the interaction between the components will now be discussed in turn.

The event rollup system 300 includes one or more processors operational over a network. The processors include a rollup operation 301 that is implemented, programmed, and reside within a non-transitory computer-readable storage medium for execution on the one or more processors.

Example processing associated with the rollup operation 301 was presented above with reference to the FIGS. 1 and 2.

The rollup 301 is configured to aggregate a status for each action of a log during a configured interval of time and then join the statuses resolved at the end of that interval of time back into the log.

According to an embodiment, the log is a CAM log.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising:
    processing, via the processors, a rollup operation against multiple log tables in a database system for an interval of time, wherein the rollup operation iteratively rollups some information from the multiple log tables and performs batch rollups on other information from the multiple log tables and identifying each batch rollup with a pending status having a numeric value greater than other statuses values;
    selecting, via the processors, a status for each action for the rollup operation; and
    joining, via the processors, a results table from the rollup operation having the statuses for the actions with the multiple log tables.

2. The method of claim 1, wherein processing further includes maintaining a minimum status value and a maximum status value for each action during the rollup operation.

3. The method of claim 2, wherein selecting further includes keeping the status for each action when that action's minimum status value equals that action's maximum status value during the rollup operation.

4. The method of claim 1, wherein processing further include permitting the interval of time to be configured.

5. The method of claim 1, wherein processing further includes limiting the scope of operations to those actions having a last known summary status of pending.

6. The method of claim 1, wherein selecting further includes determining a particular status for a particular action to be partial when that particular action's minimum status value does not equal that particular action's maximum status value at the conclusion of the rollup operation.

7. The method of claim 1, wherein selecting further includes excluding a particular computed rollup status of pending for a particular action from the rollup operation when the particular action fails to complete during the interval of time.

8. The method of claim 7, wherein processing further includes running a separate process to change summary statuses in the log for expired actions from pending to timed out after the rollup operation.

9. A method implemented and programmed within a non-transitory computer-readable storage medium and processed by one or more processors, the processors configured to execute the method, comprising:
    aggregating, via the processors, a status for each action defined in multiple log tables, wherein a rollup operation iteratively rollups some information from the multiple log tables and performs batch rollups on other information from the multiple log tables and identifying each batch rollup with a pending status having a numeric value greater than other statuses values;
    restricting, via the processors, the aggregation to an interval of time; and
    merging, via the processors that statuses for the actions into the multiple log tables at the end of the interval of time.

10. The method of claim 9 further comprising, processing the method as a set of Structured Query Language Statements.

11. The method of claim 9 further comprising, logging the start and end time of processing the method along with an indication that the method processed in the multiple log tables at the end of the interval of time.

12. The method of claim 9, wherein aggregating further includes limiting the scope of operations to those actions having a last known summary status of pending.

13. The method of claim 12, wherein restricting further includes changing those actions to have a status of timed out at the end of the interval of time.

14. The method of claim 9, wherein restricting further includes acquiring the interval of time as a configured parameter to the method.

15. The method of claim 9, wherein restricting further includes producing a results table for the statuses of the actions.

16. The method of claim 15, wherein restricting further includes eliminating from the results table those actions with a computed rollup status of pending.

17. The method of claim 16, wherein merging further includes joining the results table with the multiple log tables.

18. The method of claim 9, wherein merging further includes recognizing the multiple log tables as Common Alerting Mechanism logs for a relational database.

19. The method of claim 18, wherein recognizing further includes identifying the actions as one or more of: a send email operation, a simple network management protocol trap, and an execution of a user-defined program.

* * * * *